UNITED STATES PATENT OFFICE.

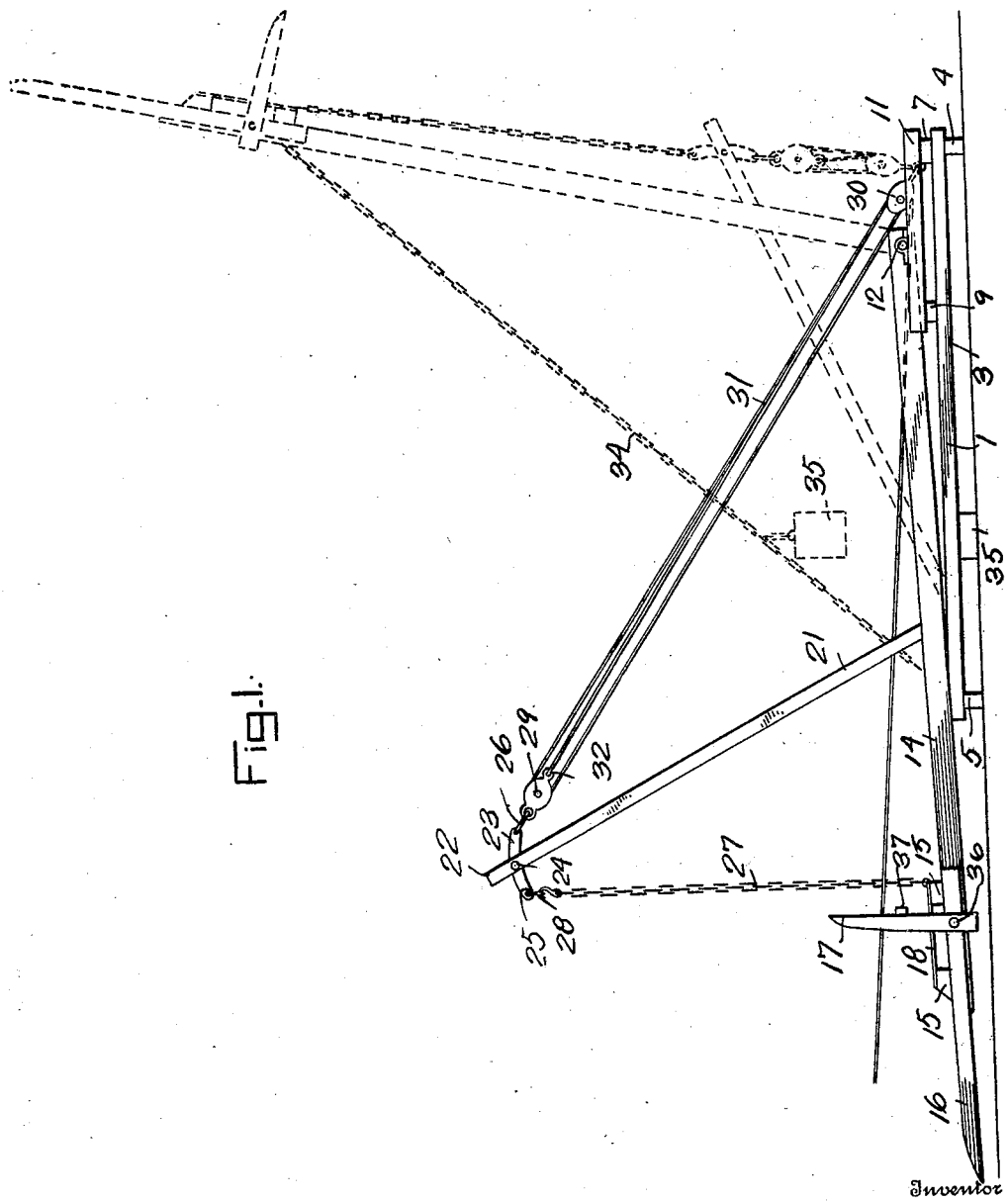

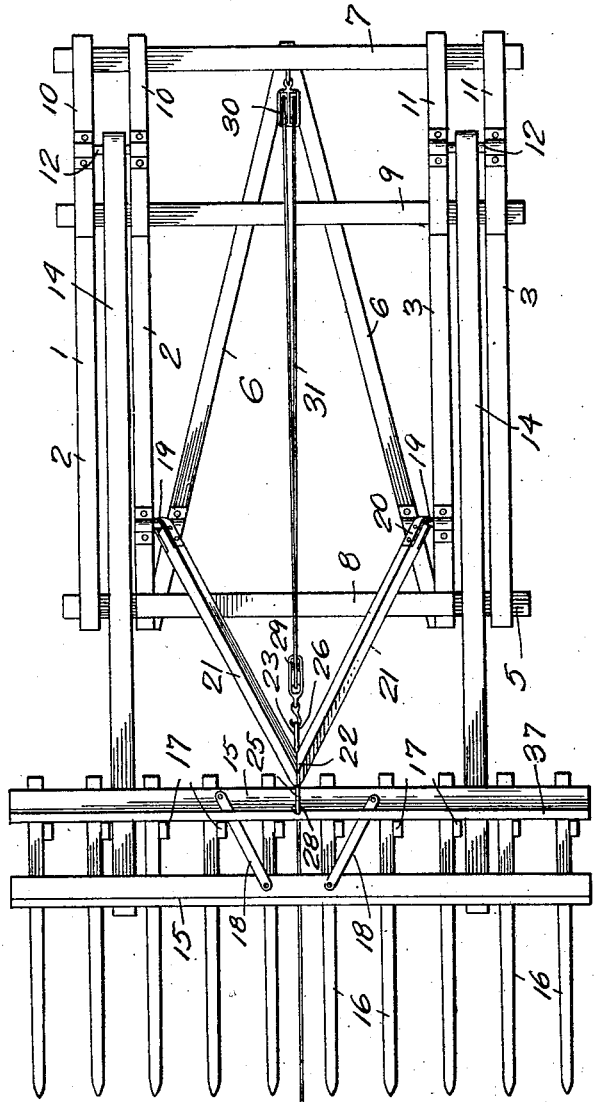

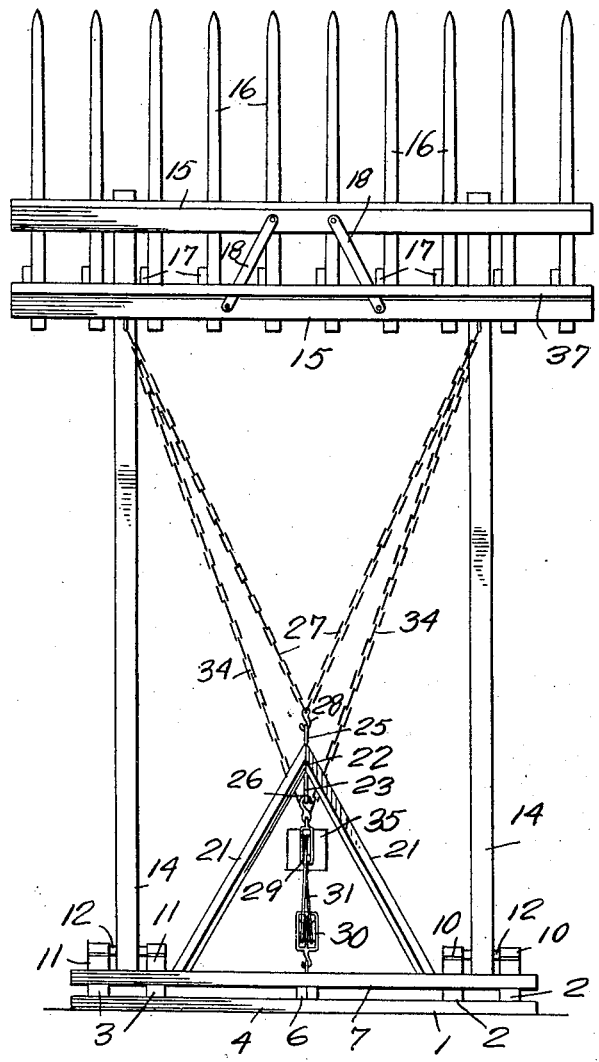

GEORGE W. JONES, OF LIVINGSTON, MONTANA.

HAY-LOADER.

No. 859,386.  Specification of Letters Patent.  Patented July 9, 1907.

Application filed March 25, 1907. Serial No. 364,364.

*To all whom it may concern:*

Be it known that I, GEORGE W. JONES, a citizen of the United States, residing at Livingston, in the county of Park, State of Montana, have invented certain new and useful Improvements in Hay-Loaders; and I do hereby declare the following to be a full, clear, and exact description of the invention, such as will enable others skilled in the art to which it appertains to make and use the same.

This invention relates to new and useful improvements in hay loaders and it has particular reference to a hay loader of that type which includes a swinging fork and a swinging frame for operating the former and having suitable connection therewith.

In connection with a hay loader of the above type the invention aims as a primary object to provide a novel construction, combination and arrangement of parts, the details of which will appear in the course of the following description, in which reference is had to the accompanying drawings, forming a part of this specification, like characters of reference designating similar parts throughout the several views wherein:—

Figure 1 is a side elevation of a hay loader constructed in accordance with the present invention and showing the parts out of operation, the manner of operation being shown in dotted lines. Fig. 2 is a top plan view thereof, the parts being in the position of Fig. 1, and the connecting chains being omitted for clearness of illustration, and Fig. 3 is a front elevation thereof, the swinging fork or hay carrier being partially elevated.

Referring specifically to the accompanying drawings the numeral 1 designates a supporting frame from which the movable elements of the invention are supported. The frame 1 is constituted of respective pairs of side bars 2 and 3, the members of each pair being disposed in spaced parallel relation. The side bars 2 and 3 are connected at their front ends by a cross bar 4 and at their rear ends by a cross bar 5. Between the innermost bars 2 and 3, converging braces 6 are disposed, which at their ends are fixed to the bars 4 and 5. Said bars 4 and 5 are arranged on the underneath surface of the bars 2 and 3 and similar bars 7 and 8 are arranged above said bars 2 and 3 in spaced parallel overlying relation, the bars 7 and 8 being likewise imposed on the ends of the braces 6. Rearwardly of the bar 7, a cross bar 9 spans the frame. The bar 9 together with the bar 7 constitutes a support for longitudinal spaced parallel bars 10 and 11 arranged in respective pairs at each side of the frame and imposed upon said bars 7 and 9 to which they are fixed.

Bolts or rods 12 are mounted transversely upon the bars 10 and 11 at each side of the frame and are projected through the lower ends of arms 14, constituting pivots therefor. The arms 14 are connected at their upper portions by parallel cross bars 15 constituting elements of the hay fork, and, with this object in view carrying the angularly disposed tines, respectively designated 16 and 17 and constituting the fork proper. Diagonal braces 18 are interposed between the bars 15 in their spaced relation to reinforce the same.

Pins 19 are mounted between the inner side bars 2 and 3 and the respectively adjacent braces, said pins being disposed adjacent the rear ends of said side bars and braces. The pins 19 project through looped straps 20 carried upon the lower ends of bars 21 converging towards their upper ends and joined thereat as at 22. The bars 21 constitute a lifting frame and with this object in view carry adjacent their joint 22 a yoke 23 pivoted centrally as at 24 and at its ends provided with depending loops 25 and 26. A chain 27 has its ends fixed to the forward cross bar 15 adjacent its connection with the arms 14. At a point central thereof said chain carries a hook 28 for engagement with the loop 25. The chain 27 affords an operative connection between the lifting frame afforded by the bars 21 and the swinging arms 14, whereby movement of the latter serves to raise or lower said arms. A sheave 29 is suspended from the loop 26 and a double sheave 30 is pivally carried upon the front cross bar 7 centrally thereof. A rope 31 has one of its ends fixed to a connection 32 carried by the housing of the sheave 29. Said rope is then trained over one of the pulleys of the sheave 30, from thence over the sheave 29 and from thence over the other pulley of the sheave 30. At its other end the rope 31 carries a hook 33 by means of which a double or swingle tree may be suspended. A second chain 34 has one end fixed to the rear cross bar 8 and its other end fixed to the rear cross bar 15 of the fork. At a determinate point a suitably constructed weight 35 is suspended from the chain 34, the function of this weight being to restore the arms 14 and the parts associated therewith to normal position after each operation of the apparatus. It is to be noted that the bar 8 is of less width than the bar 7 and terminates adjacent the inner bars 2 and 3, whereby the arms 14 may enter in the spaces between said bars 2 and 3.

In operation, when it is desired to build a stack of hay, a wagon or other conveyer discharges its contents in the fork. The horses are then driven forwardly and by reason of the connections described, the bars 21 are swung forwardly on their pivots 19 from the position of Fig. 1, to the position of Fig. 2. Such movement of the bars 21 serves to raise the arms 14 and the fork carried thereby until said arms are in such position that the load is discharged by gravity from the tines 17 of said fork. The tines 17 are preferably connected as at 36, to the respective individual tines 16, and a transverse connecting bar 37 is employed to reinforce the tines 17 in their assemblage.

When the apparatus has been operated to discharge the load in the manner set forth, the horses are backed and the weight 35 restores the parts to their normal position, as shown in Figs. 1 and 3. The operations above described are then continued *ad infinitum*.

From the foregoing description, it will be seen that simple and efficient means are provided for accomplishing the objects of the invention, but while the elements herein shown and described are well adapted to serve the functions set forth, it is obvious that various minor changes may be made in the proportions, shape and arrangement of the several parts, without departing from the spirit and scope of the invention as defined in the appended claims.

What is claimed, is—

1. An apparatus of the type set forth, comprising a frame including side bars arranged in pairs and in spaced parallel relation, front and rear end cross bars arranged above and below said respective side bars, an intervening cross bar, and parallel bars coinciding in arrangement with said side bars and imposed upon said intervening and front end cross bars, parallel arms, pivot pins projected through the lower ends thereof and mounted upon said last named parallel bars, said rear end cross bar terminating at points adjacent the inner side bars, arms coinciding with the spaces between said side bars, a fork supported by said arms, and mechanisms for raising and lowering said arms on their pivots.

2. An apparatus of the type set forth, comprising a frame including side bars, front and rear cross bars connecting said side bars at their ends, and angularly disposed braces between said cross bars, arms pivoted adjacent the front ends of said side bars, a fork carried thereby, converging bars having their lower ends spaced and constituting a lifting frame, pins projected through the lower ends of said converging bars, said pins constituting pivots and being respectively mounted upon said side bars and the braces adjacent thereto, operative connections between said converging bars and said arms, means for swinging said converging bars on their pivots, and means for restoring the parts to normal position.

In testimony whereof, I affix my signature, in presence of two witnesses.

GEORGE W. JONES.

Witnesses:
ARTHUR DAVIS,
JENNIE B. SMITH.